US012613121B2

(12) United States Patent
Poindexter

(10) Patent No.: US 12,613,121 B2
(45) Date of Patent: Apr. 28, 2026

(54) SECUREMENT SYSTEM FOR WIRELESS WATER METER CONNECTED TO HYDRANT

(71) Applicant: Logan Poindexter, Bloomfield, IN (US)

(72) Inventor: Logan Poindexter, Bloomfield, IN (US)

( * ) Notice: Subject to any disclaimer, the term of this patent is extended or adjusted under 35 U.S.C. 154(b) by 271 days.

(21) Appl. No.: 18/493,064

(22) Filed: Oct. 24, 2023

(65) Prior Publication Data

US 2024/0142285 A1    May 2, 2024

Related U.S. Application Data

(60) Provisional application No. 63/420,777, filed on Oct. 31, 2022.

(51) Int. Cl.
*G01F 15/063*     (2022.01)
*E03B 9/02*      (2006.01)
*G01F 15/18*     (2006.01)

(52) U.S. Cl.
CPC .............. *G01F 15/063* (2013.01); *E03B 9/02* (2013.01); *G01F 15/18* (2013.01)

(58) Field of Classification Search
CPC ......... G01F 15/063; G01F 15/18; E03B 9/025
USPC .......................................................... 73/201
See application file for complete search history.

(56) References Cited

U.S. PATENT DOCUMENTS 3,795,144 A    3/1974  Marchesi
6,218,995 B1   4/2001  Higgins et al.

10,346,707 B2    7/2019  Melugin et al.
2007/0005273 A1*  1/2007  Heidl ...................... G01F 1/075
                                                              702/50
2008/0150750 A1   6/2008  Parris et al.
2017/0370893 A1*  12/2017  West .................. G01N 33/1893
2021/0310222 A1*  10/2021  Melul ................... H04W 4/029

FOREIGN PATENT DOCUMENTS

CN       102995661 A      3/2013
CN      2053000688 U      6/2016
CN       207717176 U      8/2018
CN       208043158 U     11/2018
CN       208270000 U     12/2018
CN       109141567 A      1/2019

(Continued)

OTHER PUBLICATIONS

Phang Yang, PW/HMSB-SCW, Water Meter Security Enclosure: City of Sacramento Water Dept., Nov. 7, 2014.

(Continued)

*Primary Examiner* — Nathaniel T Woodward

(74) *Attorney, Agent, or Firm* — George Pappas Barrett McNagny LLP

(57)            ABSTRACT

Securement system and method includes an enclosure that may house a water meter and antenna that can be locked onto a fire hydrant. Readings of water usage are sent to a water utility department. The system includes a lockable access cover for insertion of a tool to turn a water valve within the enclosure on and off. The enclosure is configured to accommodate components inside it to be arranged so that when the access cover is pivoted, it exposes the water valve. The system may be configured to be supported by the hydrant or the ground.

11 Claims, 8 Drawing Sheets

(56) References Cited

FOREIGN PATENT DOCUMENTS

| | | | | | |
|----|----|----|----|----|----|
| CN | 109489761 | A | 3/2019 | | |
| CN | 209280073 | U | 8/2019 | | |
| CN | 110926554 | A | 3/2020 | | |
| CN | 211317437 | U | 8/2020 | | |
| CN | 211978021 | U | 11/2020 | | |
| CN | 211978022 | U | 11/2020 | | |
| CN | 212458517 | U | 2/2021 | | |
| EP | 4039893 | A1 * | 8/2022 | .......... | G05D 7/0623 |
| JP | H10185649 | A | 7/1998 | | |
| JP | 2002245581 | A | 8/2002 | | |
| KR | 100933700 | B1 | 12/2009 | | |
| TW | M597865 | U | 7/2020 | | |
| WO | WO-2021163746 | A1 * | 8/2021 | .............. | H04Q 9/00 |

OTHER PUBLICATIONS

Phang Yang, PW/HMSB-SSWD, Water Meter Security Enclosure, May 28, 2014.
Lowest Price Anti-Corrosion Plastic Water Meter Box Alibaba. com—https://www.alibaba.com/product-detail/Lowest-Price-Anti-corrosion-plastic-water_60642871748.html?spm=a2700.7724857.0. 0.34b05294ojFC3t, Accessed Oct. 23, 2023.

* cited by examiner

—Prior Art—

SECUREMENT SYSTEM FOR WIRELESS WATER METER CONNECTED TO HYDRANT

CROSS REFERENCE TO RELATED APPLICATIONS

This application claims the benefit of U.S. Provisional Application No. 63/420,777 filed Oct. 31, 2022, the entire contents of which is incorporated herein by reference.

FIELD OF THE INVENTION

The present invention relates to methods and systems for protecting water meters that are attached to a fire hydrant.

BACKGROUND

Fire hydrants are normally used for the public purpose of providing water to firefighters during an emergency. However, they are sometime used to provide water for private use, such as to fill a private swimming pool or to provide water to a building construction site before a permanent water meter is installed for the building. For such private uses, a utility authority usually connects a water meter to the hydrant temporarily. The utility can then bill the private user for the water used. However, because the meter is exposed, this system can be tampered with by the public.

It is known to provide a lock for such temporary water meters to discourage tampering and nefarious attempts to bypass the meter.

It is also known to provide permanent water meters for buildings that operate wirelessly so that a meter reading can be obtained without a visual inspection of the meter. Wireless water meters are more expensive, have more components, and are more fragile than analog water meters. Thus, it is even more important to provide a securement system for a wireless water meter. However, a securement system can impair the wireless communications features of a wireless meter or interfere with a legitimate private user's ability to actuate a valve to obtain water when needed.

It is also desirable for a securement system to be easily installed, removed and relocated to different hydrants.

SUMMARY OF THE INVENTION

A securement system and method includes a metal enclosure that may house a digital meter (including a battery) and radio antenna that can be locked onto a fire hydrant. The enclosure includes an aperture to receive water from the hydrant, and the aperture has an upper surface allows the fire hydrant to support the weight of the enclosure and space it from the ground. Readings of water usage may be wirelessly sent to the water utility department as the antenna is mounted in another aperture of the enclosure, exposing it to the exterior and allowing it to wirelessly communicate water meter information without the transmission be blocked by the enclosure. The system includes a lockable access cover for insertion of a tool to turn a water valve held within the enclosure on and off. The enclosure is configured to accommodate components inside it to be arranged so that when the access cover is pivoted or otherwise moved, it exposes the water valve. The system may be provided with handles that facilitate its installation, removal, and relocation. It may also be provided with tamper-resistant connectors so members of the public cannot disassemble or tamper with the system, or intentionally or accidentally harm the wireless water meter.

By placing the system over a wireless water meter, the meter can be kept connected to the hydrant for an extended period without the risk of someone stealing or damaging the wireless water meter. The water usage can be read remotely so a bill can be sent to the person getting the water from the hydrant.

DETAILED DESCRIPTION

Figure 1:
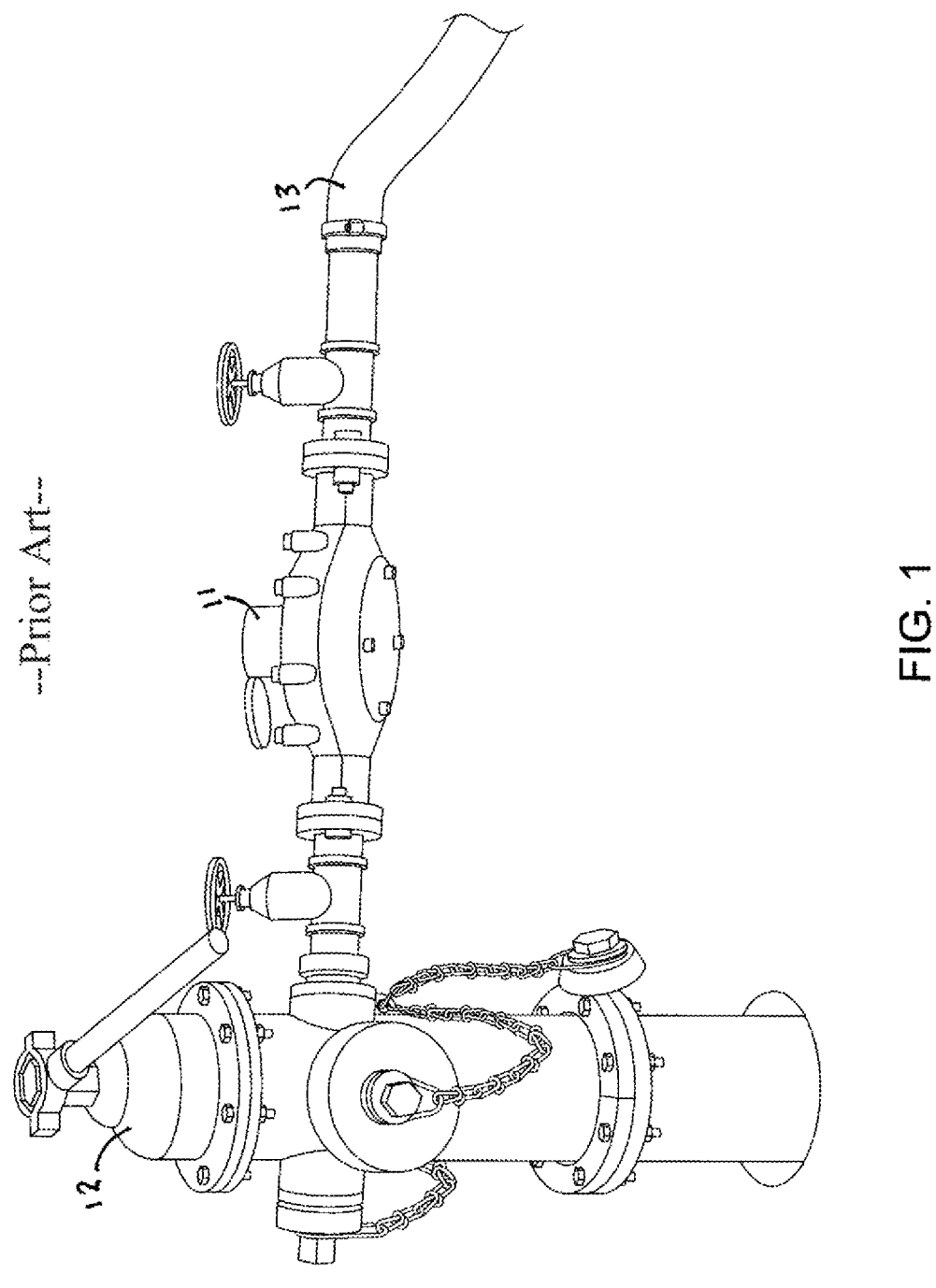
FIG. 1 is a representative prior art view of a representative temporary connection of an analog water meter connected between a hydrant and a hose.

FIG. 1 is a representative prior art view of a representative temporary connection of an analog water meter 11 connected between a hydrant 12 and a hose 13.

Figure 2:
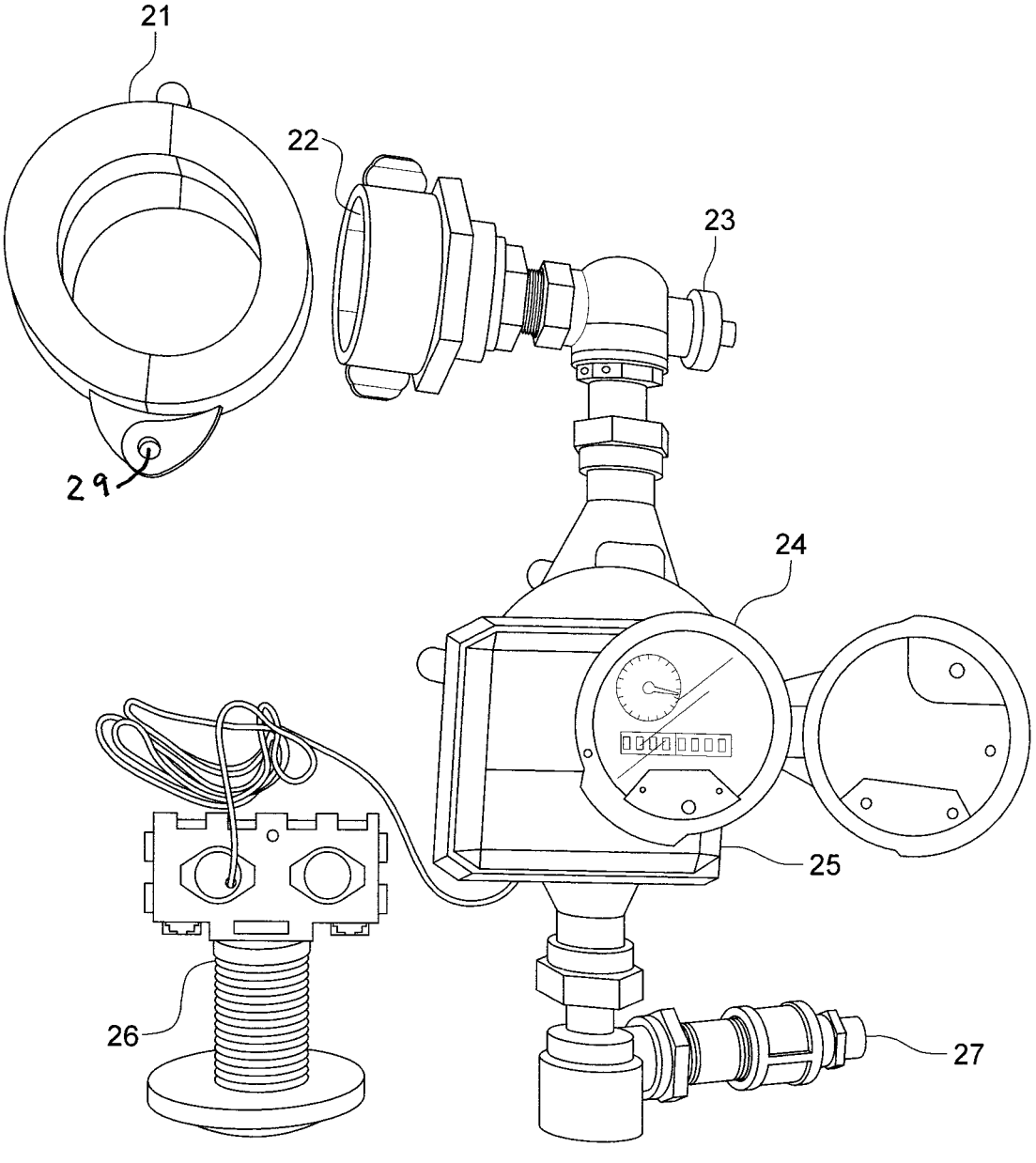
FIG. 2 shows some disassembled components of a wireless water meter system, including the fittings for connection to a hydrant and a hose.

FIG. 2 shows some disassembled components of a wireless water meter system, including the fittings for connection to a hydrant and a hose. Inlet connector 22 may threaded on to the outlet of a fire hydrant, and the connection may be covered by locking collar 21 which prevent unauthorized persons from disconnecting inlet connector 22 from the hydrant. Locking collar 21 may be locked by inserting a padlock into holes 29 formed in opposing sides of locking collar. In one embodiment, locking collar 21 may connected to water valve 23. Alternatively, locking collar may be connected to other components exterior to the enclosure (described below), that attach one or more components of the system to the hydrant. Water valve 23 is actuated by turning valve control 28. Valve 23 is connected to water meter 25 which includes meter face 24, antenna 26 and which is connected to water outlet 27.

Figure 3:
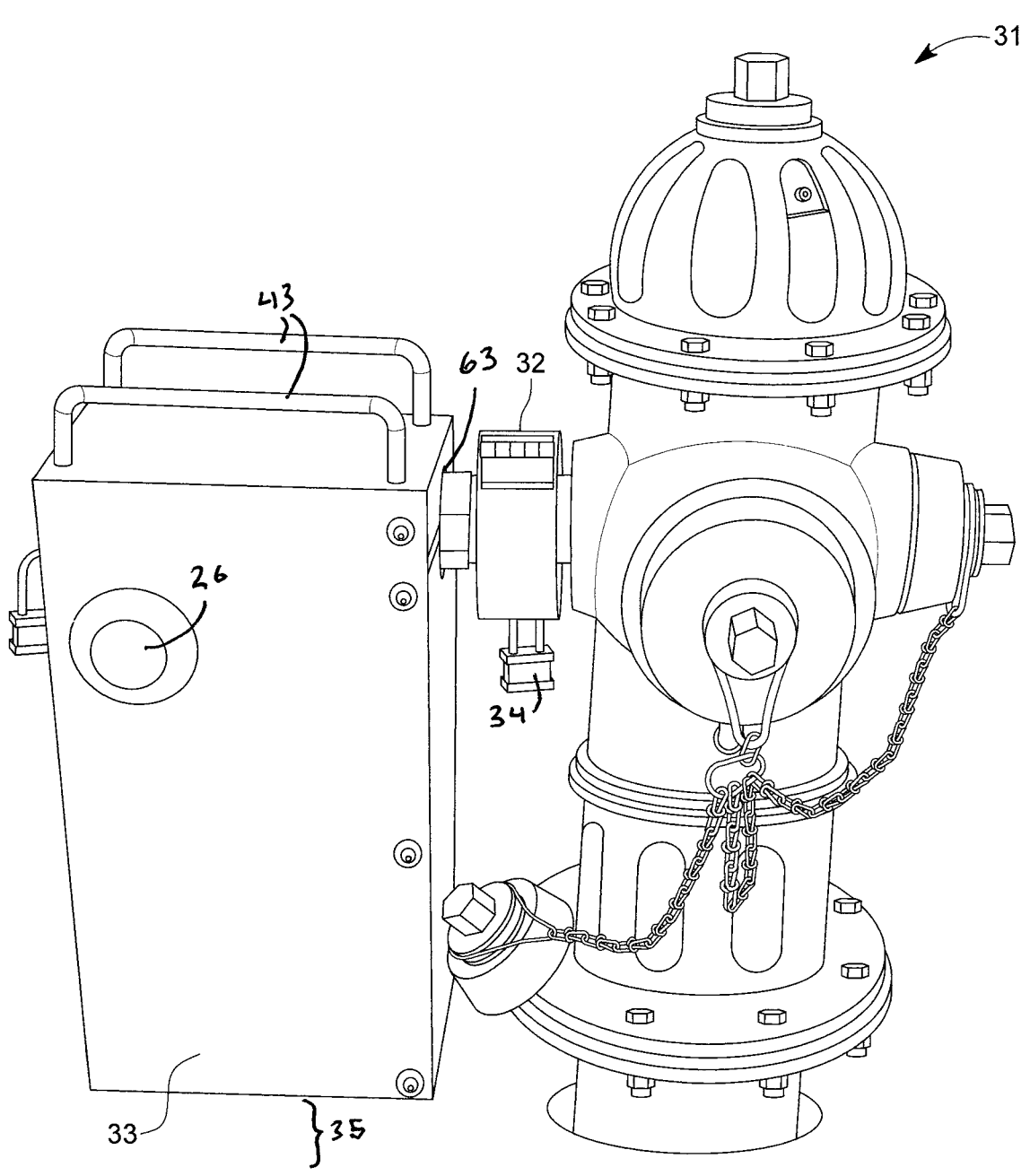
FIG. 3 shows a tamper-resistant box placed over a wireless water meter connected to a hydrant.

FIG. 3 shows a tamper-resistant enclosure 33 placed over a wireless water meter connected to a hydrant 31. Locking collar 32 is secured by padlock 34 which discourages unauthorized access to the system. Enclosure includes an aperture into which antenna 26 may be positioned to permit wireless communication with the meter. The dimensions of enclosure 33 are such that it may leave space 35 between the bottom of the enclosure and the ground to facilitate maintenance of the ground. Enclosure 33 includes an upper water inlet surface 63 which allows hydrant 31 to support the weight of enclosure 33. Handles 43 on the top of enclosure facilitate moving it.

Figure 4:
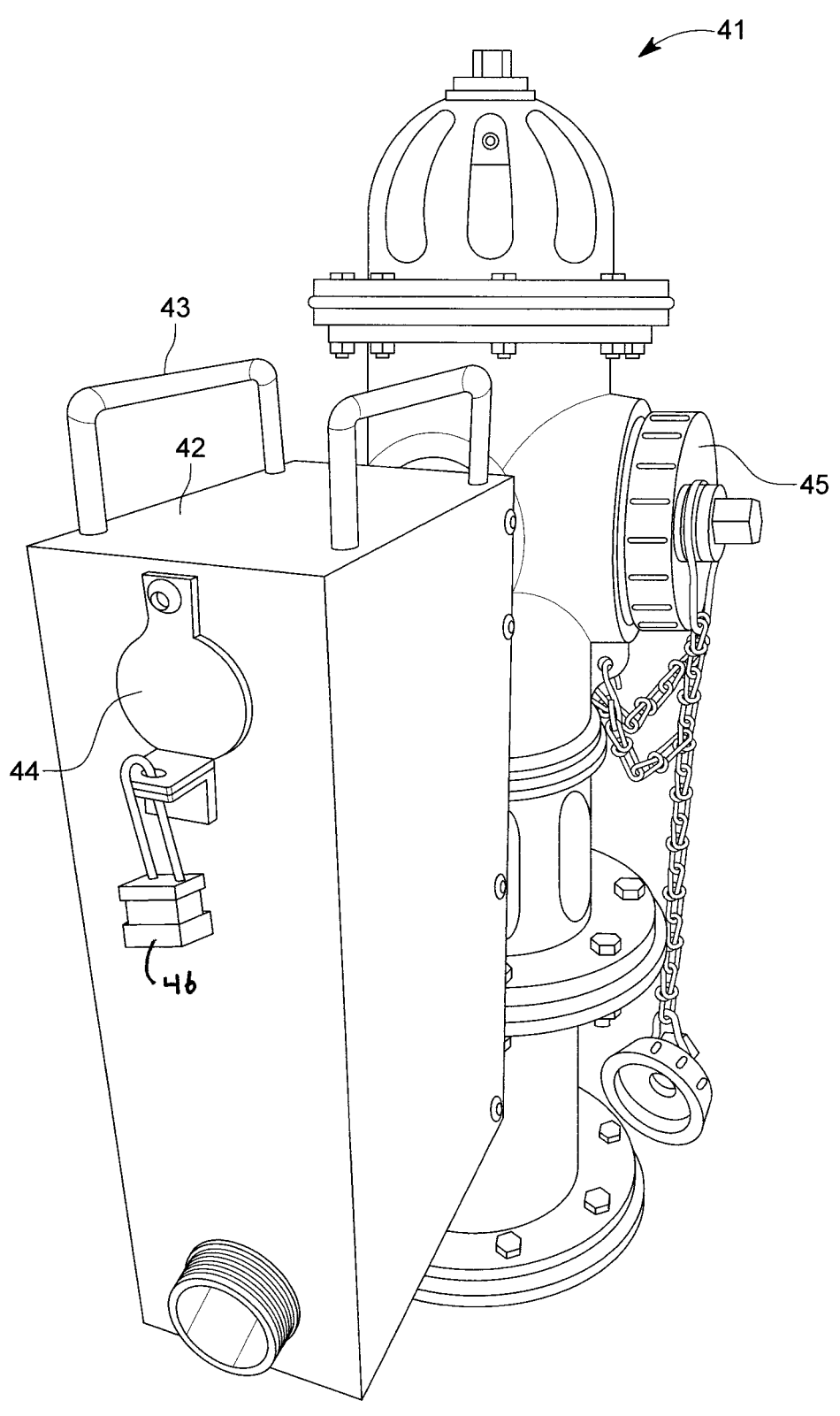
FIG. 4 shows a front and side of a tamper-resistant box placed over a wireless water meter connected to a hydrant.

FIG. 4 shows a front and side of a tamper-resistant enclosure 42 placed over a wireless water meter connected to a hydrant 41. The front includes a locking pivotable cover 44 which may be secured by padlock 46. As discussed below, when unlocked, a valve actuating tool may be inserted into the valve aperture of enclosure 42 to engage water valve 23 and control the flow of water from hydrant 41.

Figure 5:
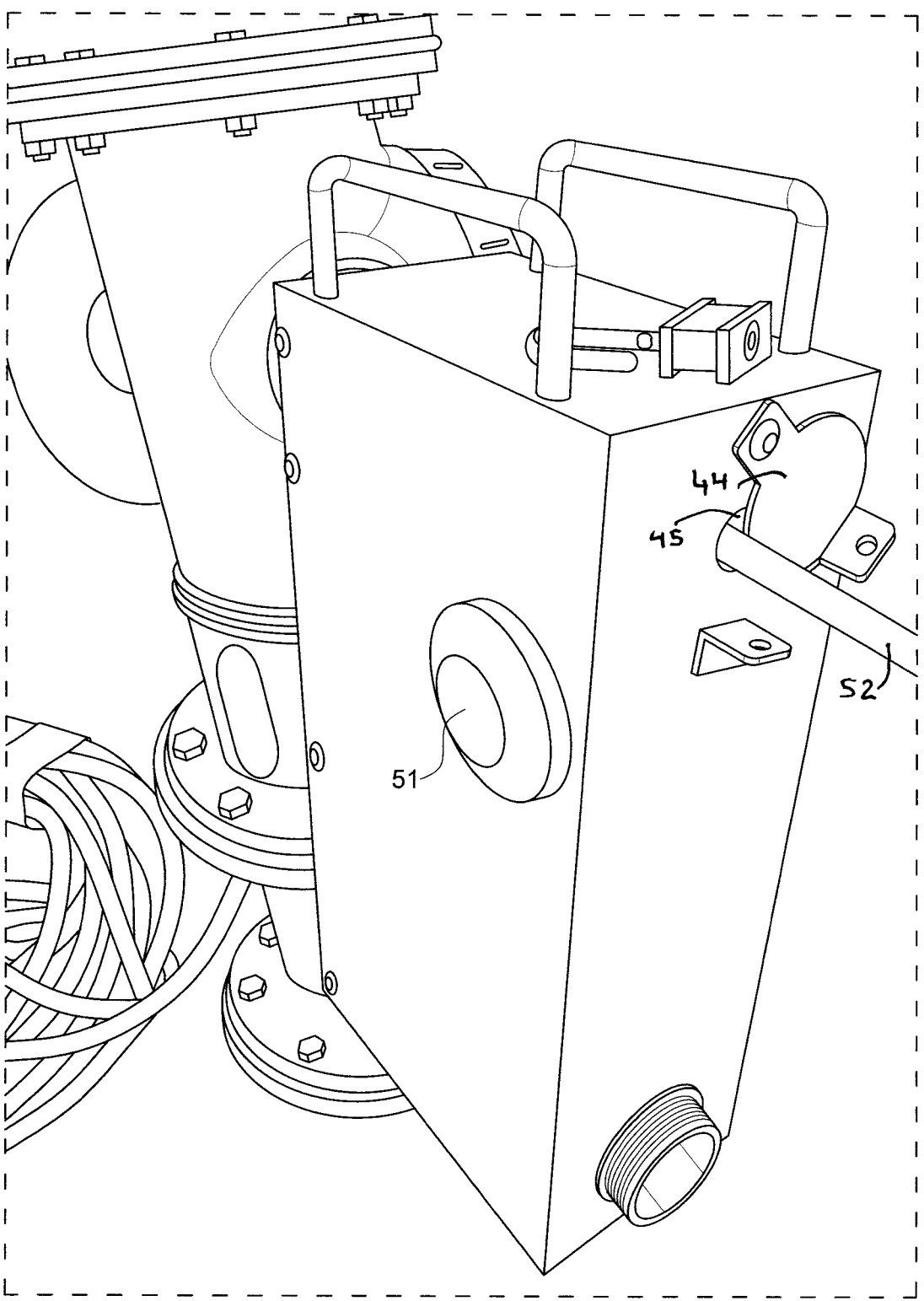
FIG. 5 shows a circular antenna of the wireless water meter extending from the box, and a tool inserted into the pivotable cover of the box to turn the water valve on or off.

FIG. 5 shows an antenna 51 of the wireless water meter mounted in the antenna aperture of enclosure. Pivotable cover 44 is shown in its open position, allowing valve actuating tool 52 to extend through valve access aperture 45 of enclosure to control the flow of water from the hydrant.

Figure 6:
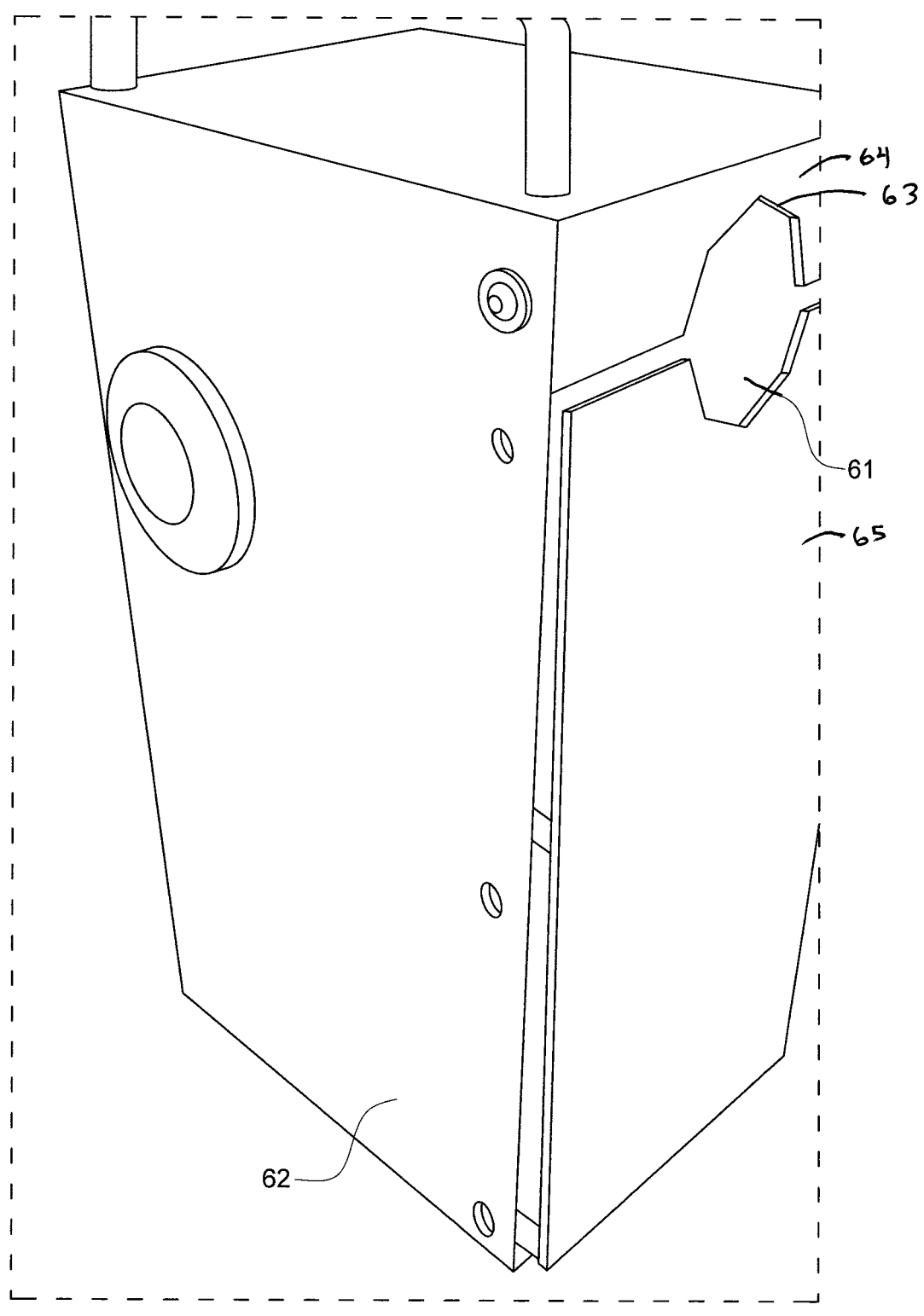
FIG. 6 shows how the back of the box is removable and connectable to the rest of the box via tamperproof or tamper-resistant screws on each side.

FIG. 6 shows how a back and side of enclosure. In one embodiment, the enclosure comprises a body 62, and a back which is comprised of upper back portion 64 and lower back portion 65. Upper back portion 64 and lower back portion may combine to form a water inlet aperture 61, which includes top surface 63. When in use, top surface portion 63 rests on the hydrant or water inlet, to thereby support the weight of enclosure and space it from the ground. Upper back portion 64 and lower back portion 65 may be secured to body by tamper resistant connectors or screws. These tamperproof screws have specially-shaped heads that require a special tool unavailable to consumers.

Figure 7:
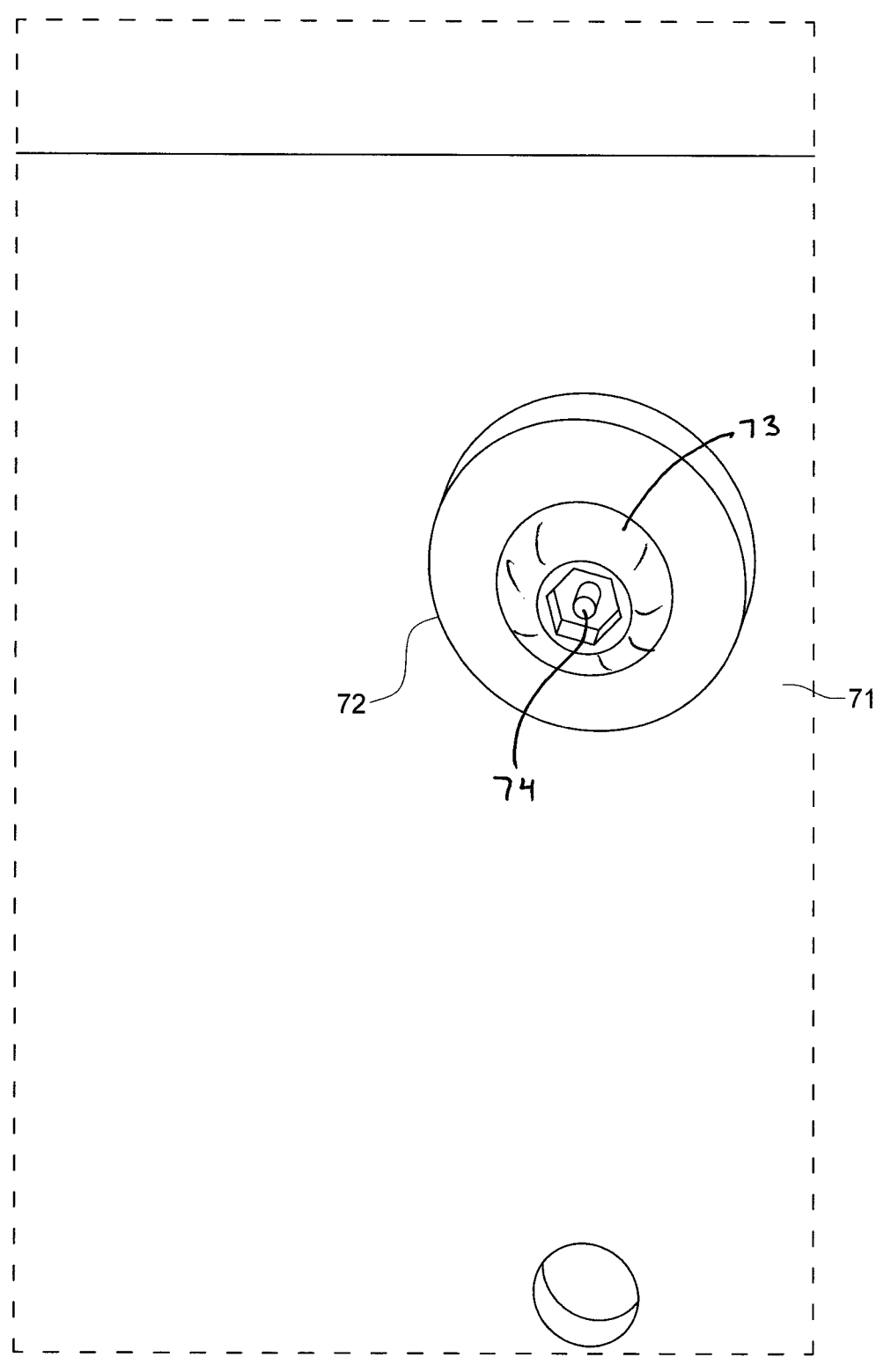
FIG. 7 shows a screw head of a tamper-resistant connector that requires a special tool unavailable to consumers.

FIG. 7 shows a washer 72 and screw head 73 of a tamper-resistant connector that requires a special tool unavailable to consumers. In one embodiment, the tamper-resistant connector requires a special tool shaped like an Allen wrench, but which is hollow so it can fit over a protrusion 74 in the middle of the screw. However, other varieties of tamper-resistant connectors may be used.

Figure 8:
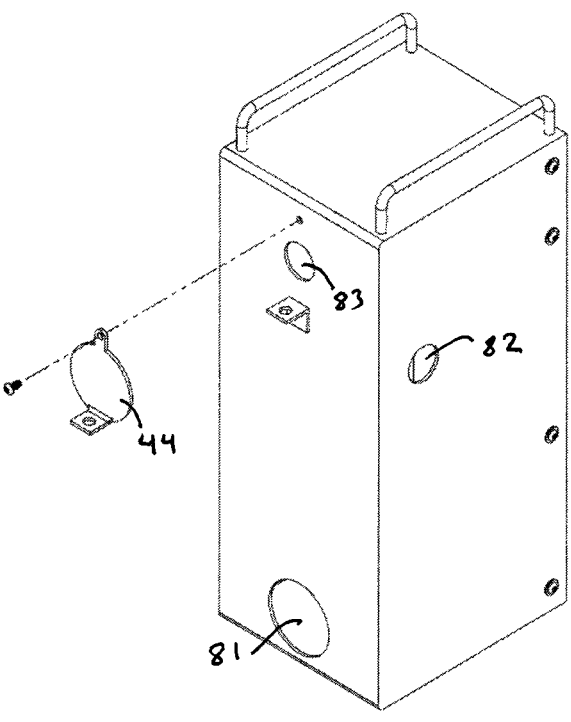
FIG. 8 shows a front side holding a pivotable valve access cover and side of an enclosure.

FIG. 8 shows a front side holding a pivotable valve access cover 44 and side of an enclosure, and water outlet aperture 81, valve access aperture 83 and antenna aperture 82.

Figure 9:
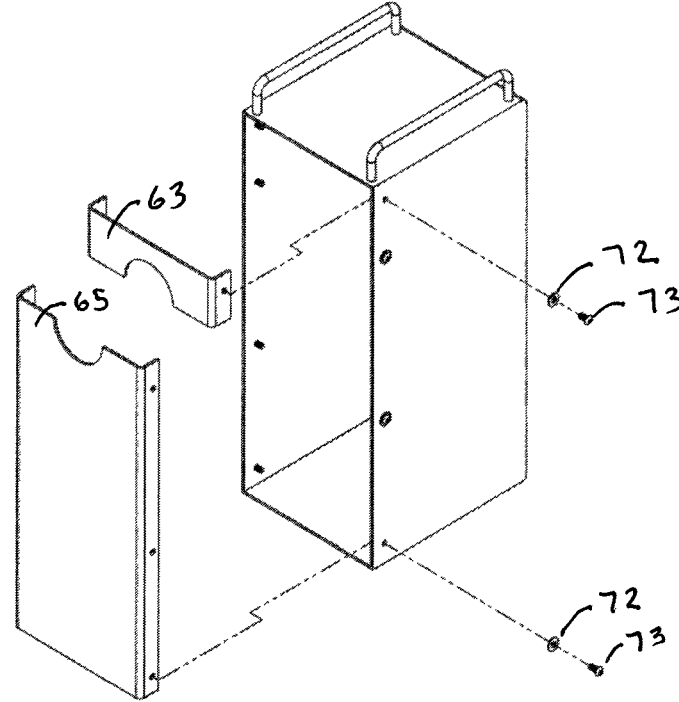
FIG. 9 shows back and side of an enclosure comprised of multiple parts that may be secured together with tamper-resistant connectors.

FIG. 9 shows the back and side of an enclosure comprised of upper portion 63 and lower portion 65 that may be secured together with washers 72 and tamper-resistant connectors 73. The tamper-resistant connectors make it easy for authorized personnel to install, remove and relocate the securement system to different hydrants or water sources.

Those of skill in the art will understand that various details of the invention may be changed without departing from the spirit and scope of the invention. Furthermore, the foregoing description is for illustration only, and not for the purpose of limitation, the invention being defined by the claims.

All references cited in this specification are incorporated herein by reference to the extent that they supplement, explain, provide a background for or teach methodology or techniques employed herein.

What is claimed is:

1. A method for securing a wireless water meter connectable to a fire hydrant having a water outlet, comprising the steps of:
    providing a wireless water meter comprising an antenna;
    connecting the wireless water meter to the water outlet of the fire hydrant;
    providing an enclosure configured to house the wireless water meter comprising an antenna, the meter being attachable to the fire hydrant extending from the ground, the enclosure comprising:
    an exterior surface and an interior,
    a water inlet aperture in the enclosure comprising an upper surface to engage a water source from the hydrant whereby the hydrant supports the weight of the enclosure allowing it can hang therefrom such that the enclosure is spaced from the ground,
    an antenna aperture in the enclosure through which the antenna may extend to the exterior of the enclosure,
    a valve access aperture in the enclosure sized to permit a valve actuating tool to be inserted therethrough,
    a lockable access cover in the enclosure movable between a first position in which the cover covers the valve access aperture and a second position in which the cover exposes the valve access aperture,
    a water outlet aperture in the enclosure;
    providing a valve operable to control the flow of liquid through the water meter;
    providing a water outlet connectable to the water meter;
    positioning the enclosure such that
    the water meter and valve are within the interior of the enclosure;
    the valve is accessible through the lockable access cover;
    the weight of enclosure is supported by the fire hydrant;
    the antenna is positioned in the antenna aperture of the enclosure;
    the water outlet is accessible through the water outlet aperture; and
    securing the enclosure with tamper-resistant hardware.

2. The method of claim 1 wherein the enclosure comprises detachable parts removably connectable to each other by tamper-resistant hardware.

3. The method of claim 1 wherein the enclosure further comprises at least one handle by which the enclosure may be lifted.

4. The method of claim 1 wherein the enclosure is comprised of metal.

5. The method of claim 1 further comprising the steps of:
    providing a lockable collar; and
    positioning the lockable collar around the connection between the water meter and the water outlet of the fire hydrant.

6. The method of claim 5 further comprising the step of locking the lockable collar.

7. A securement system for securing a wireless water meter that is connectable to a fire hydrant, comprising:
    an enclosure configured to house a wireless water meter comprising an antenna, the meter being attachable to the fire hydrant extending from the ground, comprising an exterior surface and an interior,
    a water inlet aperture in the enclosure comprising an upper surface to engage a water source from the hydrant whereby the hydrant supports the weight of the enclosure allowing it can hang therefrom such that the enclosure is spaced from the ground,
    an antenna aperture in the enclosure through which the antenna may extend to the exterior of the enclosure,
    a valve access aperture in the enclosure sized to permit a valve actuating tool to be inserted therethrough,
    a lockable access cover in the enclosure movable between a first position in which the cover covers the valve access aperture and a second position in which the cover exposes the valve access aperture,
    a water outlet aperture in the enclosure.

8. The securement system of claim 7 wherein the enclosure is comprised of detachable parts removably connectable to each other by tamper-resistant connectors.

9. The securement system of claim 7 wherein the enclosure further comprises at least one handle to permit the enclosure to be lifted.

10. The securement system of claim 7 wherein the enclosure comprises metal.

11. The securement system of claim 7 wherein the enclosure is sized to allow the enclosure to be spaced from the ground when mounted on a hydrant.

* * * * *